(12) United States Patent
Pratley (10) Patent No.: US 10,233,975 B2
(45) Date of Patent: Mar. 19, 2019

(54) ELASTOMERIC COUPLING FOR SUPERCHARGER

(71) Applicant: Eaton Corporation, Cleveland, OH (US)

(72) Inventor: Mark H. Pratley, Marshall, MI (US)

(73) Assignee: Eaton Corporation, Cleveland, OH (US)

(*) Notice: Subject to any disclaimer, the term of this patent is extended or adjusted under 35 U.S.C. 154(b) by 119 days.

(21) Appl. No.: 15/266,392

(22) Filed: Sep. 15, 2016

(65) Prior Publication Data

US 2017/0002872 A1 Jan. 5, 2017

Related U.S. Application Data

(63) Continuation of application No. PCT/US2015/020947, filed on Mar. 17, 2015.

(60) Provisional application No. 61/953,989, filed on Mar. 17, 2014, provisional application No. 62/045,873, filed on Sep. 4, 2014, provisional application No. 62/050,339, filed on Sep. 15, 2014.

(51) Int. Cl.
| | |
|---|---|
| *F16D 3/74* | (2006.01) |
| *F02B 33/38* | (2006.01) |
| *F02B 39/12* | (2006.01) |
| *F16D 3/68* | (2006.01) |

(52) U.S. Cl.
CPC ............... *F16D 3/74* (2013.01); *F02B 33/38* (2013.01); *F02B 39/12* (2013.01); *F16D 3/68* (2013.01); *F16D 2200/0056* (2013.01)

(58) Field of Classification Search
CPC ...... F16D 3/74; F16D 3/68; F16D 2200/0056; F02B 33/38; F02B 39/12
USPC ............. 464/87, 93, 137, 138; 123/559.1
See application file for complete search history.

(56) References Cited

U.S. PATENT DOCUMENTS

| | | | | |
|---|---|---|---|---|
| 2,287,391 A | * | 6/1942 | Musselman | B23Q 5/04 464/93 |
| 2,998,717 A | * | 9/1961 | Schwenk | F16D 3/28 464/93 X |

(Continued)

FOREIGN PATENT DOCUMENTS

| | | | | |
|---|---|---|---|---|
| GB | 1 500 623 | * | 2/1978 | ......... 464/93 |
| IT | 571029 | * | 12/1957 | ......... 464/93 |

OTHER PUBLICATIONS

International Search Report and Written Opinion for International Application No. PCT/US2015/020947 dated Jun. 23, 2015, 11 pages.

(Continued)

*Primary Examiner* — Greg Binda
(74) *Attorney, Agent, or Firm* — RMCK Law Group PLC (57) ABSTRACT

A coupling assembly arranged between an input shaft and a rotor shaft of a supercharger can include a first hub, a second hub and an elastomeric coupling. The first hub can be coupled to the input shaft and include a first plurality of coupling pins extending therefrom. The second hub can be coupled to the input shaft and include a second plurality of coupling pins extending therefrom. The elastomeric coupling can include a coupling body having a series of openings. The first and second coupling pins can be alternately received by the respective openings. The elastomeric coupling can be configured to absorb torsional variations from the input shaft.

14 Claims, 7 Drawing Sheets

(56) References Cited

U.S. PATENT DOCUMENTS

| | | | |
|---|---|---|---|
| 3,308,637 A * | 3/1967 | Deuring | B62D 1/16 |
| | | | 464/93 |
| 3,406,536 A | 10/1968 | Francois | |
| 3,793,849 A * | 2/1974 | Downey | F16D 3/78 |
| | | | 464/93 |
| 4,428,738 A * | 1/1984 | Loubier | F16D 3/78 |
| | | | 464/93 |
| 48,444,044 | 7/1989 | McGovern | |
| 4,953,517 A * | 9/1990 | McGovern | F02B 33/38 |
| | | | 123/559.1 |
| 5,910,049 A | 6/1999 | DeWachter et al. | |
| 6,253,747 B1 | 7/2001 | Sell et al. | |
| D781,345 S * | 3/2017 | Pratley | |
| 2006/0252555 A1 | 11/2006 | Corey et al. | |
| 2007/0082744 A1 | 4/2007 | Corey | |
| 2007/0193015 A1 | 8/2007 | Gilbert | |
| 2016/0356318 A1* | 12/2016 | Pratley | F02B 33/38 |

OTHER PUBLICATIONS

European Search Report for EP Application No. 15764501.1 dated Mar. 15, 2018, 8 pages.

* cited by examiner

ELASTOMERIC COUPLING FOR SUPERCHARGER

CROSS-REFERENCE TO RELATED APPLICATIONS

This application is a continuation of International Application No. PCT/US2015/020947 filed on Mar. 17, 2015, which claims the benefit of U.S. Patent Application No. 61/953,989 filed on Mar. 17, 2014; U.S. Patent Application No. 62/045,873 filed on Sep. 4, 2014; and U.S. Patent Application No. 62/050,339 filed on Sep. 15, 2014. The disclosures of the above applications are incorporated herein by reference.

FIELD

The present disclosure relates generally to superchargers and more particularly to an elastomeric coupling between an input shaft and a rotor shaft on a supercharger.

BACKGROUND

Rotary blowers of the type to which the present disclosure relates are referred to as "superchargers" because they effectively super charge the intake of the engine. One supercharger configuration is generally referred to as a Roots-type blower that transfers volumes of air from an inlet port to an outlet port. A Roots-type blower includes a pair of rotors which must be timed in relationship to each other, and therefore, are driven by meshed timing gears which are potentially subject to conditions such as gear rattle and bounce. Typically, a pulley and belt arrangement for a Roots blower supercharger is sized such that, at any given engine speed, the amount of air being transferred into the intake manifold is greater than the instantaneous displacement of the engine, thus increasing the air pressure within the intake manifold and increasing the power density of the engine.

In some examples, superchargers such as the Roots-type blower can create unwanted noise. For example, Roots-type blower noise may be classified as either of two types. The first is solid borne noise caused by rotation of timing gears and rotor shaft bearings subjected to fluctuating loads (the firing pulses of the engine), and the second is fluid borne noise caused by fluid flow characteristics, such as rapid changes in fluid (air) velocity. The present disclosure is primarily directed toward the solid borne noise. More particularly the present disclosure can minimize the "bounce" of the timing gears during times of relatively low speed operation, when the blower rotors are not "under load". In this regard, it is important to isolate the fluctuating input to the supercharger from the timing gears. In other examples it is desirable to account for misalignment and/or runout between the input shaft and rotor shaft. In some operating conditions, decoupling the supercharger inertia from the input belt system can help reduce unwanted noise generated in the belt system.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A coupling assembly arranged between an input shaft and a rotor shaft of a supercharger can include a first hub, a second hub and an elastomeric coupling. The first hub can be coupled to the input shaft and include a first plurality of coupling pins extending therefrom. The second hub can be coupled to the input shaft and include a second plurality of coupling pins extending therefrom. The elastomeric coupling can include a coupling body having a series of openings. The first and second coupling pins can be alternately received by the respective openings. The elastomeric coupling can be configured to absorb torsional variations from the input shaft.

According to additional features, the elastomeric coupling can further include a plurality of spokes extending from the central hub. Each spoke can have a corresponding mounting portion thereon. Each mounting portion defines a respective opening thereon. Opposite radial ends of the mounting portions can comprise bumpers thereon. Adjacent bumpers can be configured to engage each other. The elastomeric coupling can be unitary. In one example the elastomeric coupling can be formed of elastomeric material. The elastomeric coupling can be formed of thermoplastic polyester elastomer such as Hytrel® manufactured by DuPont™. In another example, the central hub, the spokes and the mounting portions can be formed of Polyether ether ketone (PEEK) and the bumpers can be formed of Hytrel®.

According to still other features, the first hub can define a first series of counter-recesses formed therein. The first series of counter-recesses can accommodate a terminal end portion of the respective second plurality of coupling pins. Each counter-recess of the first series of counter-recesses is arcuately shaped. The second hub can define a second series of counter-recesses formed therein. The second series of counter-recesses can accommodate a terminal end portion of the respective first plurality of coupling pins. Each counter-recess of the second series of counter-recesses is arcuately shaped.

A coupling assembly arranged between an input shaft and a rotor shaft of a supercharger can include a first hub, a second hub and an elastomeric coupling. The first hub can be coupled to the input shaft and have a first plurality of coupling pins extending therefrom. The second hub can be coupled to the input shaft and have a second plurality of coupling pins extending therefrom. The elastomeric coupling can have a coupling body including a central hub, a plurality of spokes and a corresponding pair of bumpers. The plurality of spokes can extend radially from the central hub and each have a mounting portion formed therein. Each mounting portion can define an opening that alternately receives the first and second plurality of coupling pins. The corresponding pair of bumpers can be formed on each mounting portion. Opposing bumpers can engage each other upon rotation of the first hub in a first direction and rotation of the second hub in a second opposite direction. The elastomeric coupling can be configured to absorb torsional variations from the input shaft.

According to additional features, the first hub can define a first series of counter-recesses formed therein. The first series of counter-recesses can accommodate a terminal end portion of the respective second plurality of coupling pins. Each counter-recess of the first series of counter-recesses is arcuately shaped. The second hub can define a second series of counter-recesses formed therein. The second series of counter-recesses can accommodate a terminal end portion of the respective first plurality of coupling pins. Each counter-recess of the second series of counter-recesses is arcuately shaped. In one example the elastomeric coupling can be formed of elastomeric material. The elastomeric coupling can be formed of thermoplastic polyester elastomer such as Hytrel® manufactured by DuPont™. In another example, the central hub, the spokes and the mounting portions can be formed of Polyether ether ketone (PEEK) and the bumpers can be formed of Hytrel®.

BRIEF DESCRIPTION OF THE DRAWINGS

The present disclosure will become more fully understood from the detailed description and the accompanying drawings, wherein.

DETAILED DESCRIPTION

Figure 1:
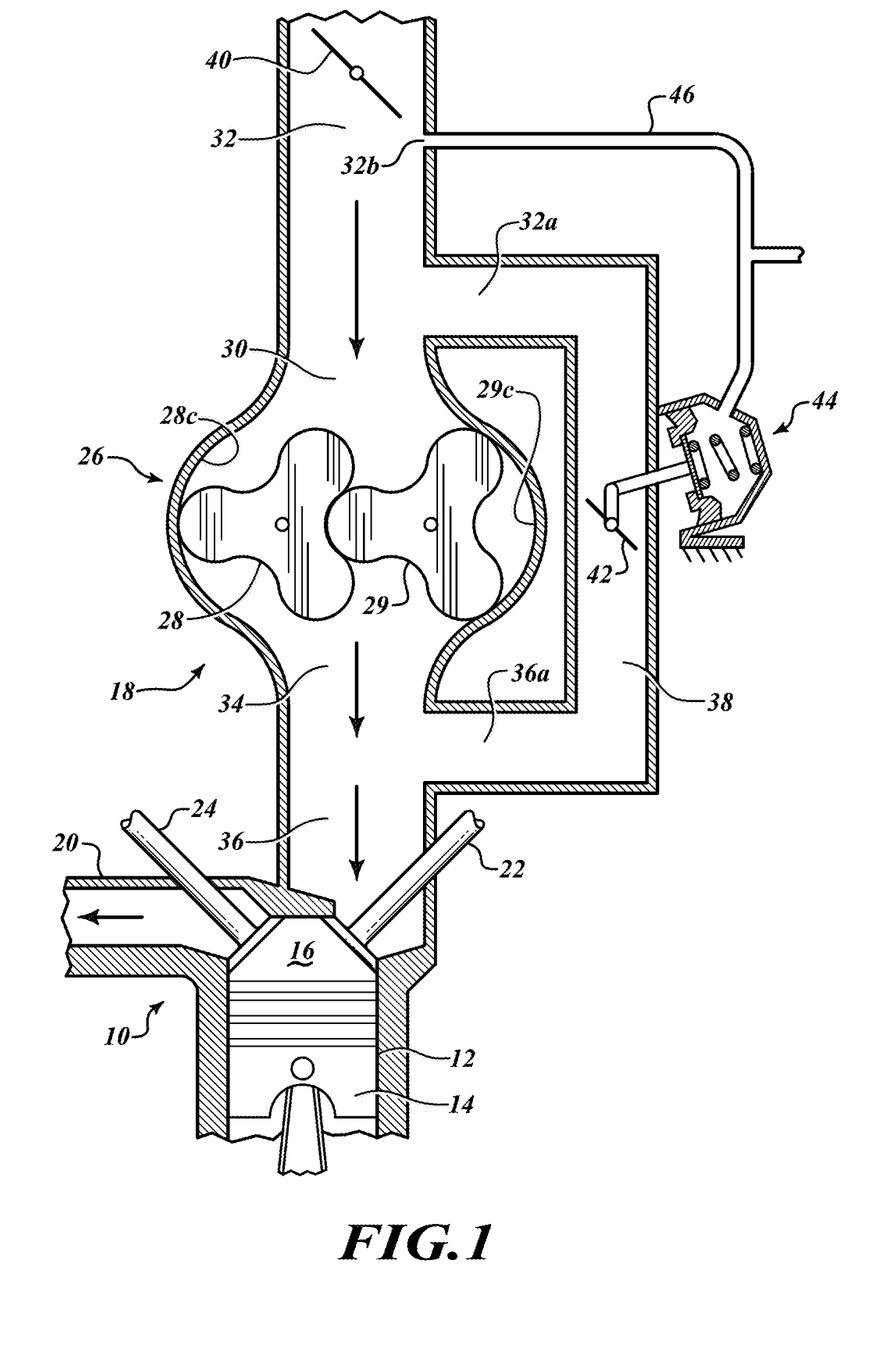
FIG. 1 is a schematic illustration of an intake manifold assembly having a positive displacement blower or supercharger constructed in accordance to one example of the present disclosure.

With initial reference to FIG. 1, a schematic illustration of an exemplary intake manifold assembly, including a Roots blower supercharger and bypass valve arrangement is shown. An engine 10 can include a plurality of cylinders 12, and a reciprocating piston 14 disposed within each cylinder and defining an expandable combustion chamber 16. The engine 10 can include intake and exhaust manifold assemblies 18 and 20, respectively, for directing combustion air to and from the combustion chamber 16, by way of intake and exhaust valves 22 and 24, respectively.

The intake manifold assembly 18 can include a positive displacement rotary blower 26, or supercharger of the Roots type. Further description of the rotary blower 26 may be found in commonly owned U.S. Pat. Nos. 5,078,583 and 5,893,355, which are expressly incorporated herein by reference. The blower 26 includes a pair of rotors 28 and 29, each of which includes a plurality of meshed lobes. The rotors 28 and 29 are disposed in a pair of parallel, transversely overlapping cylindrical chambers 28c and 29c, respectively. The rotors 28 and 29 may be driven mechanically by engine crankshaft torque transmitted thereto in a known manner, such as by a drive belt (not specifically shown). The mechanical drive rotates the blower rotors 28 and 29 at a fixed ratio, relative to crankshaft speed, such that the displacement of the blower 26 is greater than the engine displacement, thereby boosting or supercharging the air flowing to the combustion chambers 16.

The blower 26 can include an inlet port 30, which receives air or air-fuel mixture from an inlet duct or passage 32, and further includes a discharge or outlet port 34, directing the charged air to the intake valves 22 by means of a duct 36. The inlet duct 32 and the discharge duct 36 are interconnected by means of a bypass passage, shown schematically at reference 38. If the engine 10 is of the Otto cycle type, a throttle valve 40 can control air or air-fuel mixture flowing into the intake duct 32 from a source, such as ambient or atmospheric air, in a well know manner. Alternatively, the throttle valve 40 may be disposed downstream of the supercharger 26.

A bypass valve 42 is disposed within the bypass passage 38. The bypass valve 42 can be moved between an open position and a closed position by means of an actuator assembly 44. The actuator assembly 44 can be responsive to fluid pressure in the inlet duct 32 by a vacuum line 46. The actuator assembly 44 is operative to control the supercharging pressure in the discharge duct 36 as a function of engine power demand. When the bypass valve 42 is in the fully open position, air pressure in the duct 36 is relatively low, but when the bypass valve 42 is fully closed, the air pressure in the duct 36 is relatively high. Typically, the actuator assembly 44 controls the position of the bypass valve 42 by means of a suitable linkage. The bypass valve 42 shown and described herein is merely exemplary and other configurations are contemplated. In this regard, a modular (integral) bypass, an electronically operated bypass, or no bypass may be used.

Figure 2:
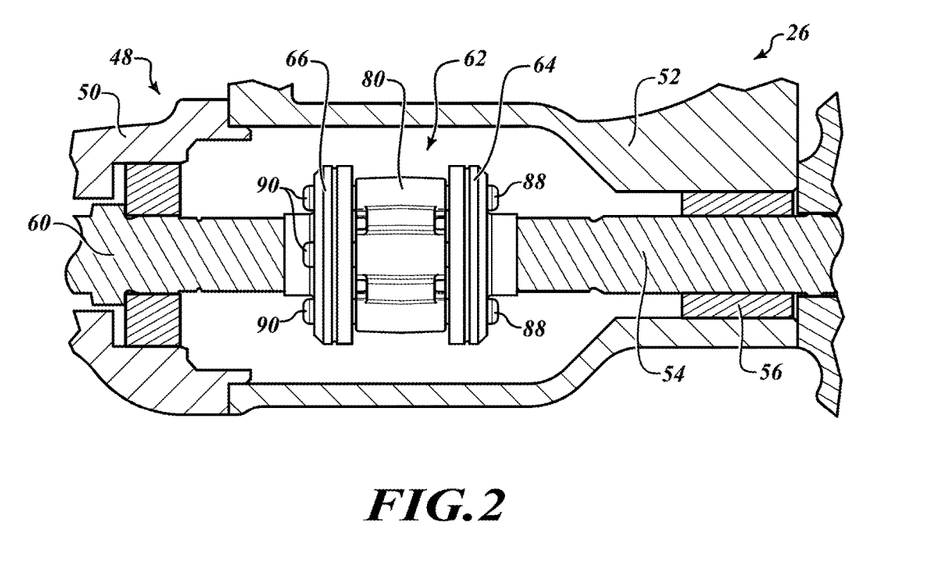
FIG. 2 is an enlarged, fragmentary, axial cross-section of the input section of the supercharger of FIG. 1 and having a coupling assembly used to couple an input shaft and a rotor shaft and constructed in accordance to one example of the present disclosure.
Figure 3:
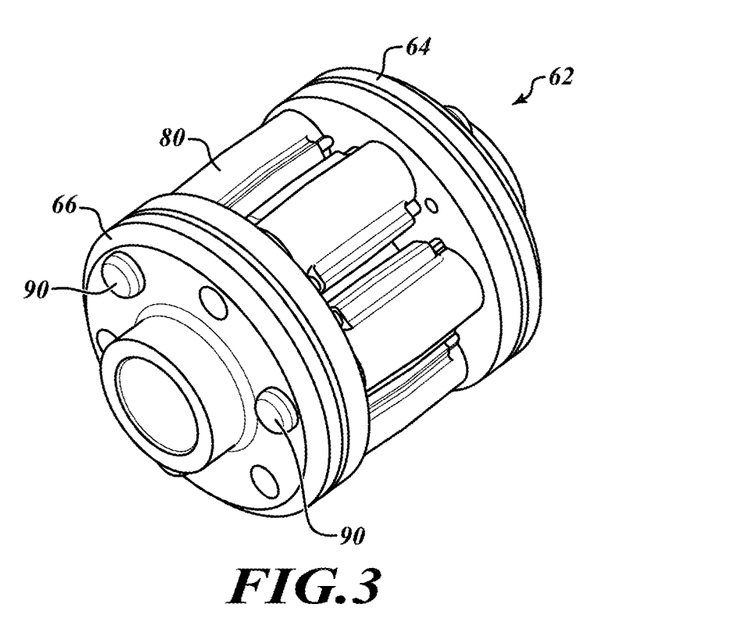
FIG. 3 is front perspective view of the coupling assembly of FIG. 2.
Figure 4:
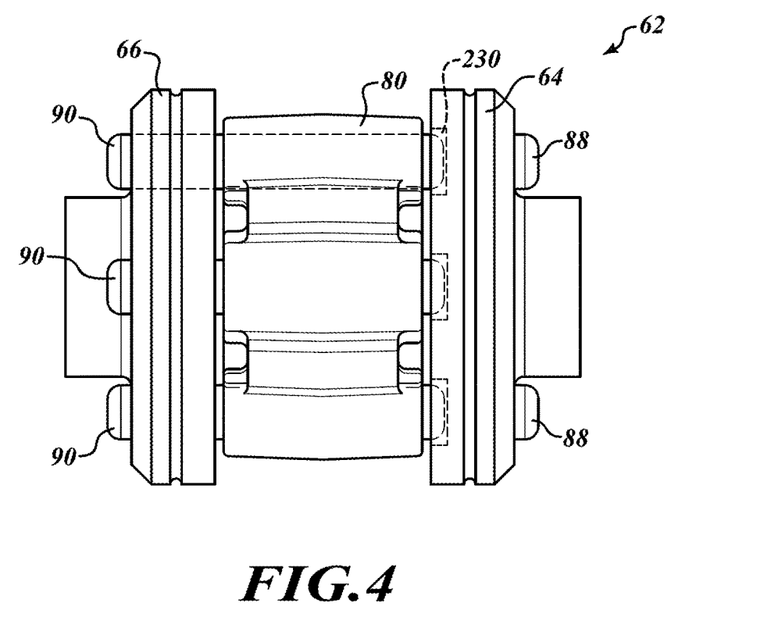
FIG. 4 is a side view of the coupling assembly of FIG. 3.
Figure 5A:
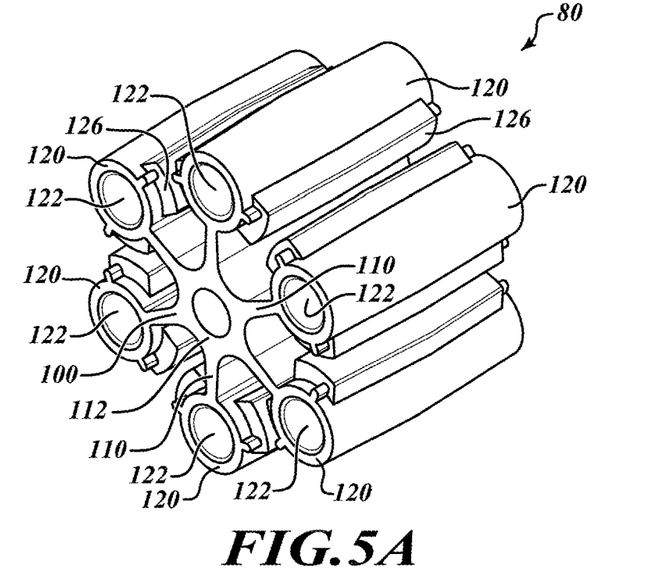
FIG. 5A is a perspective view of an elastomeric coupling of the coupling assembly of FIG. 4 and shown in a static position.
Figure 5B:
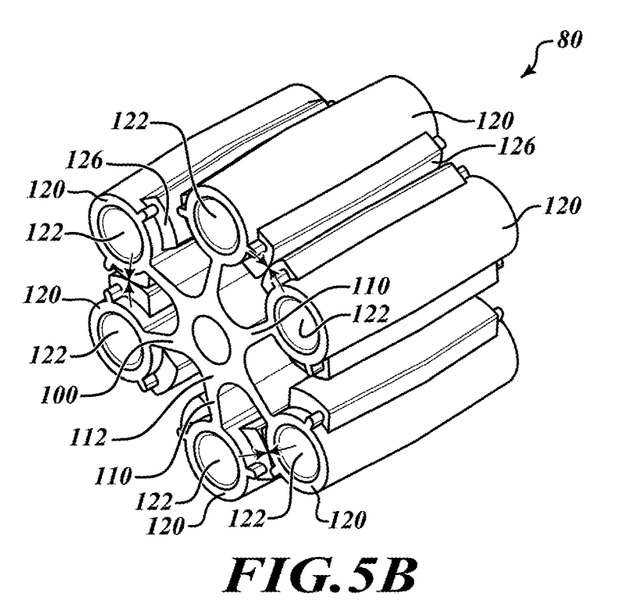
FIG. 5B is a perspective view of the elastomeric coupling of FIG. 5A shown with the coupler pins removed during a damping event where adjacent bumpers engage each other according to one example of the present disclosure.
Figure 6:
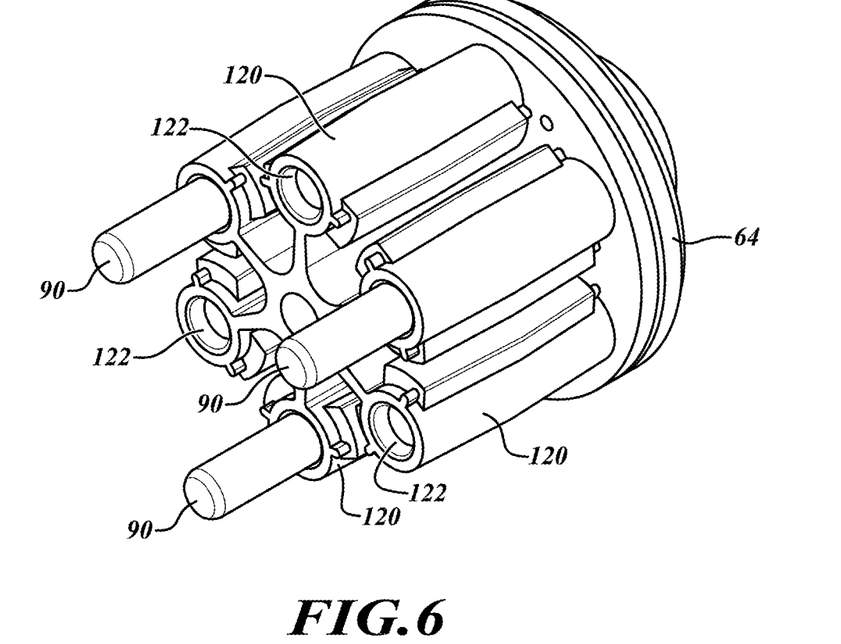
FIG. 6 is a perspective view of the elastomeric coupling and an output hub of the coupling assembly of FIG. 2.
Figure 7:
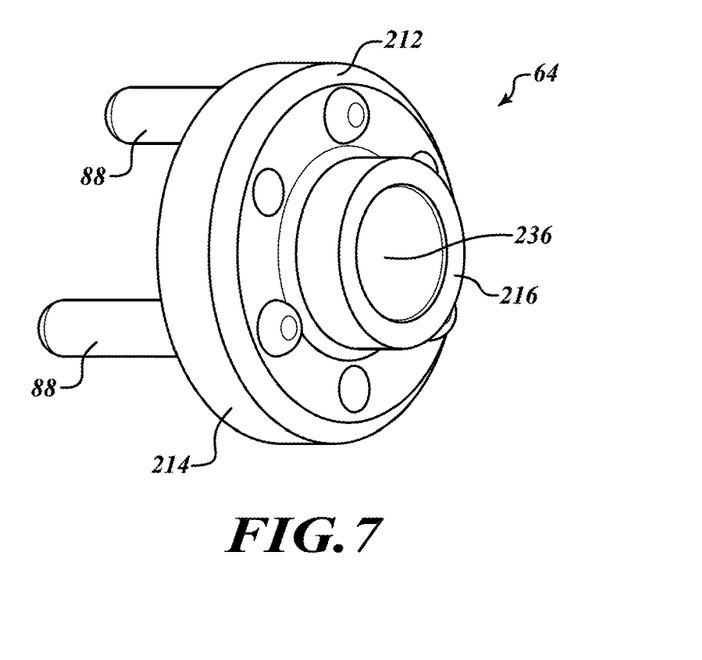
FIG. 7 is a front perspective view of a first hub of the coupling assembly of FIG. 2.
Figure 8:
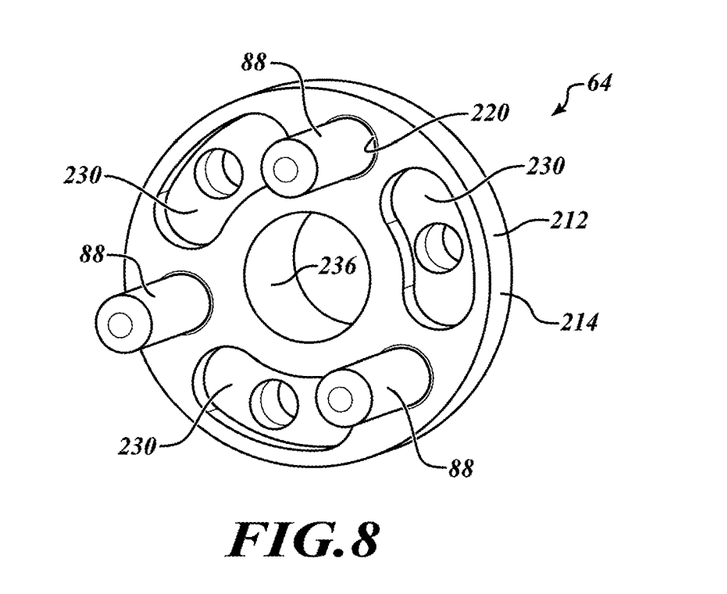
FIG. 8 is a rear perspective view of the first hub of FIG. 7.

With specific reference now to FIG. 2, an input section 48 of the blower 26 is shown. The input section 48 can include a housing member 50, which forms a forward end of the chambers 28c and 29c. Attached to the housing member 50 is a forward housing 52 within which is disposed an input shaft 54. The input shaft 54 is supported within the forward housing 52 by at least one bearing 56. Rotatably supported by the housing member 50 is a rotor shaft 60, upon which is mounted the blower rotor 28 (see FIG. 1). A coupling assembly 62 couples the input shaft 54 to the rotor shaft 60. In one example, a first hub 64 can couple the input shaft 54 to the coupling assembly 62 on a first end and a second hub 66 can couple the rotor shaft 60 to the coupling assembly 62 on an opposite end. While not specifically shown a first timing gear may be mounted on a forward end of the rotor shaft. The first timing gear may define teeth that are in meshed engagement with gear teeth of a second timing gear that is mounted on the second rotor shaft. The second rotor shaft would be in driving engagement with the blower rotor 29.

In one configuration, positive torque is transmitted from an internal combustion engine (of the periodic combustion type) to the input shaft 54 by any suitable drive means, such as a belt and pulley drive system (not shown herein). Torque is transmitted from the input shaft 54 to the rotor shaft 60 through the coupling assembly 62. The coupling assembly 62 of the present disclosure provides torsional damping and can further account for misalignment between the input shaft 54 and the rotor shaft 60. When the engine 10 is driving the timing gears and the blower rotors 28 and 29, such is considered to be transmission of positive torque. On the other hand, whenever the momentum of the rotors 28 and 29 overruns the input from the input shaft 54, such is considered to be the transmission of negative torque.

With additional reference now to FIGS. 3-8, the coupling assembly 62 constructed in accordance to one example of the present disclosure will be described in greater detail. The coupling assembly 62 can generally include an elastomeric coupling 80, a first plurality of coupler pins 88 and a second plurality of coupler pins 90. In the example shown, the first and second plurality of coupler pins 88 and 90 are constructed similarly.

The elastomeric coupling 80 can be formed by a combination of Polyether ether ketone (PEEK) and Hytrel®. Hytrel® is manufactured by DuPont™. In another example, the elastomeric coupling 80 can be unitarily formed of elastomeric material such as Hytrel® or Nylon 46. In another example, the elastomeric coupling 80 can be formed of Vamac® manufactured by DuPont™. In one example, the elastomeric material can be a synthetic elastomeric (elastic polymer). The elastomeric coupling 80 can be molded or poured as an amorphous liquid. The elastomeric material can absorb the rotational energy from the coupler pins 88 and 90 during operation of the rotary blower 26 to provide dampening. The elastomeric coupling 80 is configured to absorb torsional variations from the input shaft 54.

The elastomeric coupling 80 generally includes a coupling body 100 (FIG. 5A) having a plurality of spokes 110 extending from a central hub 112. Each of the spokes 110 extend from the central hub 112 to mounting portions 120. Each of the mounting portions 120 define an opening 122. The openings 122 are configured to selectively receive the coupler pins 88 and 90 in alternating fashion. Opposite radial ends of the mounting portions 120 include bumpers 126. During use, torsional loads can be transferred from the respective first and second coupler pins 88 and 90 through the coupling body 100. In doing so, mounting portions 120 associated with the coupler pins 88 can move in a first rotatable direction while mounting portions 120 associated with the coupler pins 90 can move in a second opposite rotatable direction. In doing so, adjacent bumpers 126 can be configured to move toward each other and eventually engage each other (FIG. 5B) and further dampen load. The spokes 110 can elastically deform to allow movement of the mounting portions 120 and bumpers 126 toward each other. In one configuration, the central hub 112, spokes 110 and mounting portions 120 can be formed of PEEK and the bumpers 126 can be overmolded and/or formed of Hytrel®. An exemplary elastomeric coupling shown in the upper left of FIG. 9 illustrates the distinct materials.

With particular reference now to FIGS. 3-8, the first hub 64 will be described in greater detail. In general, the first hub 64 is used to couple the input shaft 54 to the coupling assembly 62. The second hub 66 is used to couple the rotor shaft 60 to the coupling assembly 62. The first hub 64 and the second hub 66 are constructed similarly. In this regard, only the first hub 64 will be described. The first hub 64 can generally include a first hub body 212 including a central hub body 214 and a distal protruding section 216. The central hub body 214 includes a plurality of apertures 220 that receive coupler pins 88 therein. A series of counter-recesses 230 are formed in the central hub body 214. The counter-recesses are formed in an arcuate shape. The counter-recesses 230 are arranged to accommodate a terminal end portion of the coupler pins 90 (FIG. 2). The arcuate shape can accommodate relative rotational movement of the coupler pins 90 in the counter-recesses 230. A central bore 236 is formed through the first hub 212. In one example, the input shaft 54 can be press-fit into the central bore 236.

In an assembled position, the coupler pins 90 extending from the second hub 66 can extend through the respective openings 122 of the coupling 80. Similarly, the coupler pins 88 extending from the first hub 64 can extend through the respective openings 122 (again coupler pins 88 and 90 alternate) of the coupling 80. During operation, the coupling assembly 62 provides torsional dampening between the input shaft 54 to the rotor shaft 60. In this regard, the mounting portions 120 provide parallel springs for the first hub 64 and the second hub 66 as they absorb rotational energy from the coupler pins 88 and 90. In this regard, the coupling assembly 62 provides damping to provide misalignment degree of freedom, torsional rate reduction and torsional dampening.

Figure 9:
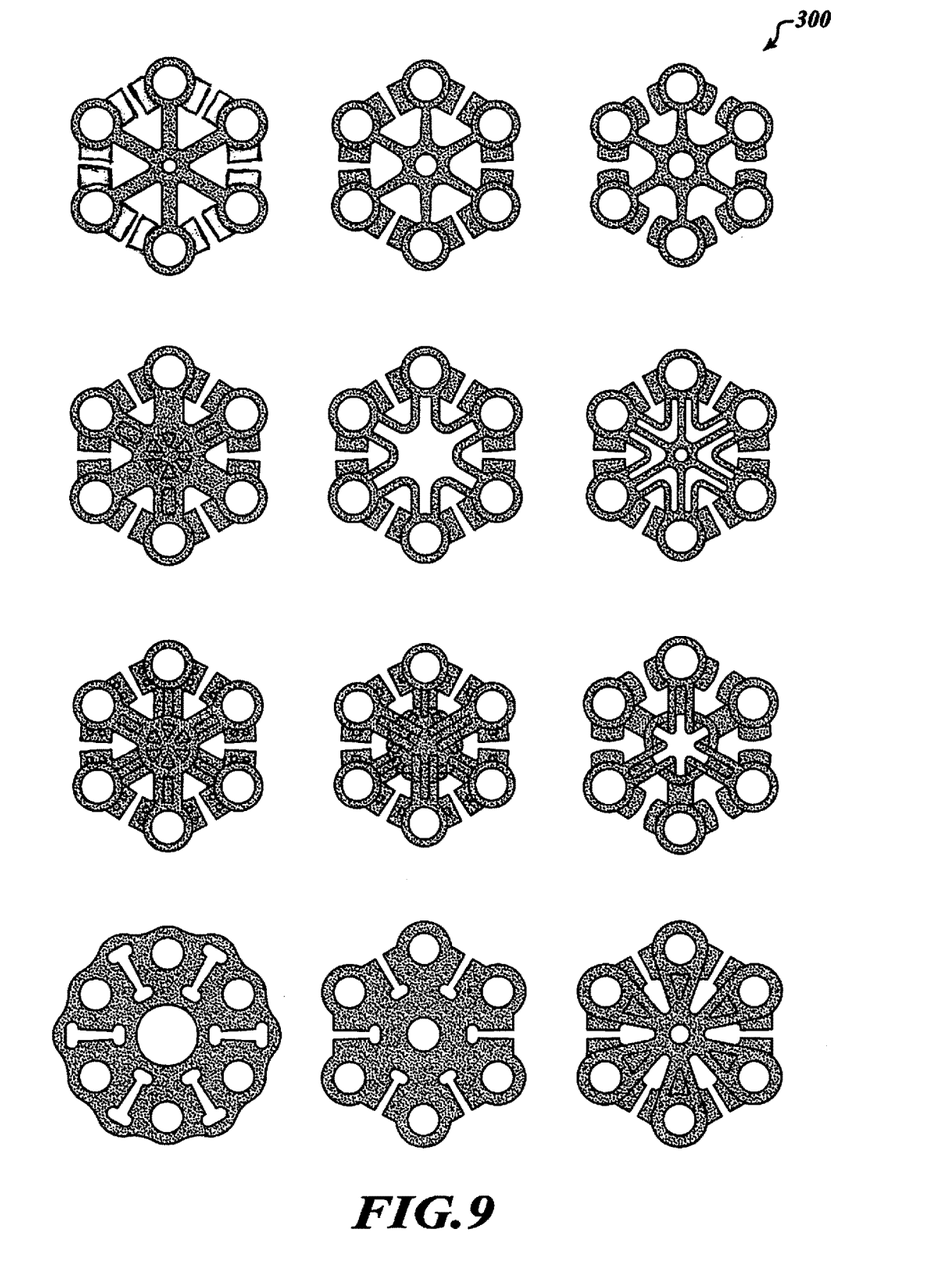
FIG. 9 is a front view of a plurality of elastomeric couplings according to various examples of the present disclosure.

FIG. 9 shows a collection of elastomeric couplings 300 constructed in accordance to additional features. As illustrated, various elastomeric couplings may provide dedicated spokes that lead to mounting portions having various shapes. The respective bumper portions can be configured with various geometries suitable for specific applications. As can be appreciated, some spoke geometries having thicker material may provide greater resistance to absorb rotational energy.

The foregoing description of the examples has been provided for purposes of illustration and description. It is not intended to be exhaustive or to limit the disclosure. Individual elements or features of a particular example are generally not limited to that particular example, but, where applicable, are interchangeable and can be used in a selected example, even if not specifically shown or described. The same may also be varied in many ways. Such variations are not to be regarded as a departure from the disclosure, and all such modifications are intended to be included within the scope of the disclosure.

What is claimed is:

1. A coupling assembly arranged between an input shaft and a rotor shaft of a supercharger, the coupling assembly comprising:
   a first hub coupled to the input shaft and having a first plurality of coupling pins extending therefrom, wherein the first hub defines a first series of counter-recesses formed therein, wherein the first series of counter-recesses accommodate a terminal end portion of the respective second plurality of coupling pins;
   a second hub coupled to the rotor shaft and having a second plurality of coupling pins extending therefrom; and
   an elastomeric coupling having a coupling body including a series of openings, wherein the first and second plurality of coupling pins are alternately received by the respective openings, the elastomeric coupling configured to absorb torsional variations from the input shaft, wherein the elastomeric coupling further includes a plurality of spokes extending from a central hub, each spoke of the plurality of spokes having a corresponding mounting portion thereon, wherein each mounting portion defines a respective opening of the series of openings thereon, wherein opposite radial ends of the mounting portions comprise bumpers thereon, wherein adjacent bumpers are configured to engage each other, wherein the spokes are formed of a first material and the bumpers are formed of a second material, distinct from the first material.

2. The coupling assembly of claim 1 wherein the elastomeric coupling is unitary.

3. The coupling assembly of claim 1 wherein each counter-recess of the first series of counter-recesses is arcuately shaped.

4. The coupling assembly of claim 3 wherein the second hub defines a second series of counter-recesses formed therein, wherein the second series of counter-recesses accommodate a terminal end portion of the respective first plurality of coupling pins.

5. The coupling assembly of claim 4 wherein each counter-recess of the second series of counter-recesses is arcuately shaped.

6. A coupling assembly arranged between an input shaft and a rotor shaft of a supercharger, the coupling assembly comprising:
- a first hub coupled to the input shaft and having a first plurality of coupling pins extending therefrom, wherein the first hub defines a first series of counter-recesses formed therein;
- a second hub coupled to the rotor shaft and having a second plurality of coupling pins extending therefrom, wherein the first series of counter-recesses accommodate a terminal end portion of the respective second plurality of coupling pins; and
- an elastomeric coupling having a coupling body including:
  - a central hub;
  - a plurality of spokes extending radially from the central hub and each having a mounting portion formed thereon, each mounting portion defining an opening that alternately receives the first and second plurality of coupling pins; and
  - a corresponding pair of bumpers formed on each mounting portion, wherein opposing bumpers engage each other upon rotation of the first hub in a first direction and rotation of the second hub in a second opposite direction;
- wherein the elastomeric coupling is configured to absorb torsional variations from the input shaft.

7. The coupling assembly of claim 6 wherein each counter-recess of the first series of counter-recesses is arcuately shaped.

8. The coupling assembly of claim 6 wherein the second hub defines a second series of counter-recesses formed therein, wherein the second series of counter-recesses accommodate a terminal end portion of the respective first plurality of coupling pins.

9. The coupling assembly of claim 6 wherein each counter-recess of the second series of counter-recesses is arcuately shaped.

10. A coupling assembly arranged between an input shaft and a rotor shaft of a supercharger, the coupling assembly comprising:
- a first hub coupled to the input shaft and having a first plurality of coupling pins extending therefrom;
- a second hub coupled to the rotor shaft and having a second plurality of coupling pins extending therefrom, the first and second hubs being equivalently shaped; and
- an elastomeric coupling having a coupling body including:
  - a central hub;
  - a plurality of spokes extending radially from the central hub and each having a mounting portion formed thereon, each mounting portion defining an opening that alternately receives the first and second plurality of coupling pins; and
  - a corresponding pair of bumpers formed on each mounting portion, wherein opposing bumpers engage each other upon rotation of the first hub in a first direction and rotation of the second hub in a second opposite direction;
- wherein the elastomeric coupling is configured to absorb torsional variations from the input shaft.

11. The coupling assembly of claim 10, wherein the first hub defines a first series of counter-recesses formed therein, wherein the first series of counter-recesses accommodate a terminal end portion of the respective second plurality of coupling pins.

12. The coupling assembly of claim 11 wherein each counter-recess of the first series of counter-recesses is arcuately shaped.

13. The coupling assembly of claim 10 wherein the second hub defines a second series of counter-recesses formed therein, wherein the second series of counter-recesses accommodate a terminal end portion of the respective first plurality of coupling pins.

14. The coupling assembly of claim 13 wherein each counter-recess of the second series of counter-recesses is arcuately shaped.

* * * * *